US012122030B2

(12) United States Patent
Hartmann et al.

(10) Patent No.: US 12,122,030 B2
(45) Date of Patent: Oct. 22, 2024

(54) HAND-HELD POWER TOOL

(71) Applicant: Hilti Aktiengesellschaft, Schaan (LI)

(72) Inventors: Markus Hartmann, Mauerstetten (DE); Philipp Lorenz, Munich (DE); Aaron Wiedner, Landsberg (DE); Michael Götzfried, Holzhausen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/023,071

(22) PCT Filed: Aug. 17, 2021

(86) PCT No.: PCT/EP2021/072783
§ 371 (c)(1),
(2) Date: Feb. 24, 2023

(87) PCT Pub. No.: WO2022/043121
PCT Pub. Date: Mar. 3, 2022

(65) Prior Publication Data

US 2023/0294261 A1 Sep. 21, 2023

(30) Foreign Application Priority Data

Aug. 31, 2020 (EP) .................................... 20193601

(51) Int. Cl.
*B25D 17/00* (2006.01)
*B25D 11/12* (2006.01)
*B25D 17/06* (2006.01)

(52) U.S. Cl.
CPC ............ *B25D 17/06* (2013.01); *B25D 11/125* (2013.01); *B25D 2217/0015* (2013.01)

(58) Field of Classification Search
CPC ...................................................... B25D 17/06
See application file for complete search history.

(56) References Cited

U.S. PATENT DOCUMENTS

| | | | | |
|---|---|---|---|---|
| 1,959,516 A | | 5/1934 | Baker et al. | |
| 4,015,670 A | * | 4/1977 | Rear | E21B 4/14 173/15 |
| 4,290,492 A | * | 9/1981 | Sides | B25D 11/125 173/118 |

(Continued)

FOREIGN PATENT DOCUMENTS

| | | |
|---|---|---|
| DE | 679558 C | 8/1939 |
| DE | 1602006 A1 | 5/1970 |

(Continued)

OTHER PUBLICATIONS

International Search Report of PCT/EP2021/072783 dated Oct. 8, 2021.

*Primary Examiner* — Eyamindae C Jallow
(74) *Attorney, Agent, or Firm* — Davidson Kappel LLC

(57) ABSTRACT

A hand-held power tool, which has a pneumatic impact mechanism with an impact piston that is able to be moved back and forth along a working axis in a guide tube by a pneumatic spring, is characterized in that a cylindrical surface of the impact piston has a plurality of cutouts that are distributed in the circumferential direction, and the cutouts take up at least 30%, at least 50% and/or at least 70% of the circumference of the cylindrical surface of the impact piston.

22 Claims, 4 Drawing Sheets

(56) References Cited

U.S. PATENT DOCUMENTS

| | | | | | |
|---|---|---|---|---|---|
| 4,312,412 | A * | 1/1982 | Pillow | E21B 4/14 173/66 |
| 5,205,363 | A * | 4/1993 | Pascale | E21B 4/14 173/17 |
| 6,119,796 | A * | 9/2000 | Schmid | B25D 11/125 173/118 |
| 2009/0133893 | A1 | 5/2009 | Zhong et al. | |
| 2016/0311103 | A1 | 10/2016 | Wiedner et al. | |
| 2019/0314970 | A1 | 10/2019 | Hartmann et al. | |

FOREIGN PATENT DOCUMENTS

| | | | | |
|---|---|---|---|---|
| DE | 2011718 | A1 * | 9/1971 | B25D 17/06 |
| EP | 1825963 | A2 | 8/2007 | |
| EP | 2065139 | A1 | 6/2009 | |
| EP | 2886261 | A1 | 6/2015 | |
| EP | 3 335837 | A1 | 6/2018 | |
| GB | 1343206 | A | 1/1974 | |

* cited by examiner

HAND-HELD POWER TOOL

FIELD OF THE INVENTION

The present invention relates to a hand-held power tool.

BACKGROUND

Striking or chiseling hand-held power tools, for example hammer drills, usually have a pneumatic impact mechanism driven by an electric motor. The pneumatic impact mechanism has an impact piston that is moved back and forth in a guide tube by a pneumatic spring and directly strikes the end face of a tool held in a tool fitting or strikes said tool via an anvil. In the process, a cylinder surface of the impact piston is guided in the guide tube, wherein a gap between the impact piston and guide tube can contain a lubricant for reducing friction.

SUMMARY OF THE INVENTION

In order to start the striking mode, a breakaway force has to be overcome, which is made up of static friction between the impact piston and guide tube and shear friction of the lubricant in the lubricating gap. Lubrication, sealing, dimensions and tolerances of the impact mechanism are designed with regard to a typical operating temperature of the hammer drill, this temperature, on account of heating by the friction of moving components and thermal losses in the pneumatic spring, typically lying between 80° C. and 150° C. At these temperatures, the breakaway force of the impact piston is low and can be overcome by the hammer drill without problems, and so the striking mode can start immediately when the hammer drill is switched on.

However, at low temperatures, in particular below freezing point, there is the problem that the viscosity of the lubricant in the gap between the impact piston and guide tube and thus the breakaway force is increased, thereby preventing reliable starting of the hammer drill. This can have the result that the hammer drill has to be heated in an idle state for several minutes until the impact mechanism starts and the hammer drill is fully available.

A reduction in the impact frequency at low temperatures, proposed in EP 3 335 837 A1, in order to improve the cold-start behavior can be realized only in mechatronic hand-held power tools.

Against this background, an object of the present invention is to improve the cold-start behavior of a hand-held power tool having an impact mechanism.

Accordingly, a hand-held power tool having a pneumatic impact mechanism is provided. The pneumatic impact mechanism has an impact piston that is able to be moved back and forth along a working axis in a guide tube by means of a pneumatic spring. A cylindrical surface of the impact piston has a plurality of cutouts that are distributed in the circumferential direction. The cutouts take up at least 30%, at least 50% and/or at least 70% of the circumference of the cylindrical surface of the impact piston.

As a result of the cutouts, the area of a guide face of the impact piston guided in the guide tube is reduced. As a result, an extent of a lubricating gap that is formed between the guide face of the impact piston and the guide tube is reduced. As a result of the reduction in the extent of the lubricating gap, a breakaway force of the impact piston when starting up the hand-held power tool can be reduced. Thus, the impact mechanism can start quickly even at cold temperatures and thus with very viscous, thick and sticky lubricant. In this case, the extent of the lubricating gap is in particular reduced without changing radial tolerances (fit) between the impact piston and the guide tube. In other words, the extent of the lubricating gap is reduced without changing a lubricating-gap width in a radial direction between the guide faces of the impact piston and the guide tube.

The hand-held power tool is in particular a striking or chiseling hand-held power tool. The hand-held power tool is for example a hammer drill.

The pneumatic impact mechanism serves in particular for the striking driving of a tool, for example a drill bit, into a substrate to be worked. The striking direction is parallel to the working axis. The impact mechanism is driven by a motor of the hand-held power tool. The impact mechanism has in particular an exciter (for example an exciter piston) which is designed to be moved back and forth periodically along the working axis by the motor by means of an eccentric and of a connecting rod. The impact piston is, in particular, coupled via the pneumatic spring to the exciter and carried along by the latter.

The pneumatic spring is formed by a pneumatic chamber between the impact piston, the exciter and the guide tube. In the event of positive pressure in the pneumatic chamber (air pressure in the chamber exceeds ambient pressure), a force in the striking direction acts on the impact piston. In the event of negative pressure in the pneumatic chamber (air pressure in the chamber is lower than ambient pressure), a force counter to the striking direction acts on the impact piston.

The impact piston has a substantially cylindrical shape. The cylindrical shape has a first end face for receiving a pulse of the exciter, and a second end face for emitting a pulse (via an anvil or directly) to the tool held in a tool fitting. Moreover, between the two end faces, the cylindrical shape has a lateral face, which has the cylindrical surface.

The circumferential direction of the cylindrical surface is in particular a direction around a circumference of the cylindrical shape in cross section. The circumferential direction is in particular a direction around a circumference of the lateral face.

The plurality of cutouts are, in particular, distributed in the circumferential direction such that they are distributed around a circumference of the cylindrical lateral face.

The cutouts take up at least 30%, at least 50% and/or at least 70% of the circumference, i.e. of the circumferential length, of the cylindrical surface of the impact piston at one or more determined axial positions of the impact piston.

According to one embodiment, the cylindrical surface of the impact piston has at least one guide ring face and the cutouts take up at least 30%, at least 50% and/or at least 70% of the at least one guide ring face.

In particular, the guide ring face has the cutouts, which constitute interruptions in the guide face, and residual guide faces between the cutouts.

According to a further embodiment, the cutouts are distributed uniformly in the circumferential direction.

As a result, the residual guide faces between the cutouts are also distributed uniformly in the circumferential direction, with the result that good guidance of the impact piston in the guide tube is achieved.

According to a further embodiment, the cutouts have an elongate shape extending parallel to the working axis.

As a result, the area of the guide face per circular ring can be greatly reduced, with the result that the cold-start behavior of the impact mechanism can be further improved, while at the same time the risk of tilting of the impact piston can be reduced or prevented.

In particular, the elongate shape of the cutouts extends parallel to a longitudinal direction of the impact piston.

According to a further embodiment, the cutouts are recesses, hollows, facets and/or flats.

In particular, the cutouts are arranged only in a radial peripheral region of the cylindrical impact piston, while a core region of the cylindrical impact piston forms a solid body. In particular, a depth of the cutouts in a radial direction is less than a radius of the cylindrical shape of the impact piston. For example, the depth of the cutouts in a radial direction, as measured from the cylindrical surface (i.e. measured from the surface of the residual guide segments between the cutouts), is less than 50%, less than 70%, less than 90% of the radius of the cylindrical shape of the impact piston.

According to a further embodiment, the cutouts have been produced by means of machining, in particular grinding, milling and/or a faceting cut.

This allows easy production of the cutouts.

For example, the cutouts have been produced by means of centerless grinding (through-feed grinding).

According to a further embodiment, the cutouts have been produced by means of non-cutting deformation.

According to a further embodiment, the cutouts are knurls which have been produced by means of knurling and subsequent finish grinding.

According to a further embodiment, the cylindrical surface of the impact piston has at least three cutouts in the circumferential direction.

In particular, the cylindrical surface of the impact piston has at least three cutouts around a circumference of the cylindrical surface.

According to a further embodiment, the impact piston has a first end face for receiving a pulse of an exciter, a second end face for emitting a pulse to a tool, and an annular groove, arranged next to the first end face, for receiving a sealing ring. Furthermore, the cylindrical surface of the impact piston has at least two guide ring faces which are arranged between the annular groove and the second end face and have the plurality of cutouts. Moreover, a radially inwardly offset ring face is arranged between the at least two guide ring faces.

The annular groove allows the reception of a preloaded sealing ring (for example an O-ring). By way of the sealing ring, the pneumatic chamber of the pneumatic spring can be sealed off better. As a result of the radially inwardly offset ring face, which does not represent a guide face for guiding in the guide tube, the area of the guide face of the impact piston can be reduced even further. As a result of the at least two guide ring faces, which are spaced apart by the radially inwardly offset ring face, guidance along a significant length of the impact piston (for example the entire length of the impact piston) can be provided. As a result, tilting of the impact piston can be reduced or prevented even more.

The second end face is designed in particular to emit a pulse to a tool via an anvil and a tool fitting.

The cylindrical surface of the impact piston can additionally have, in embodiments, a further guide ring face, having the cutouts, between the annular groove and the first end face.

In embodiments, the cutouts in one of the guide ring faces can be arranged in a manner offset in the circumferential direction with respect to the cutouts in another of the guide ring faces.

As a result, better guidance of the impact piston in the guide tube is possible, and easier production of the impact piston for example by means of through-feed grinding.

According to a further embodiment, the cutouts take up at least 30%, at least 50% and/or at least 70% of each of the at least two guide ring faces.

According to a further embodiment, the cylindrical surface of the impact piston is divided in the circumferential direction by the plurality of cutouts into a plurality of guide segments for guiding on an inner face of the guide tube.

According to a further embodiment, the impact mechanism has an exciter piston which is designed to be moved back and forth periodically along the working axis in the guide tube by a motor of the hand-held power tool, wherein the impact piston is coupled to the exciter piston via the pneumatic spring so as to be movable along the working axis.

In such an exciter-piston impact mechanism, in which the lubricating gap is formed between the impact piston and the passive, static guide tube (rather than between the impact piston and a forcibly excited exciter cylinder, as in an exciter-cylinder impact mechanism), the improvement in the cold-start behavior brought about by the cutouts is particularly desirable.

BRIEF DESCRIPTION OF THE FIGURES

The following description explains the invention with reference to exemplary embodiments and figures, in which.

Identical or functionally identical elements are indicated by the same reference signs in the figures, unless stated otherwise.

DETAILED DESCRIPTION

Figure 1:
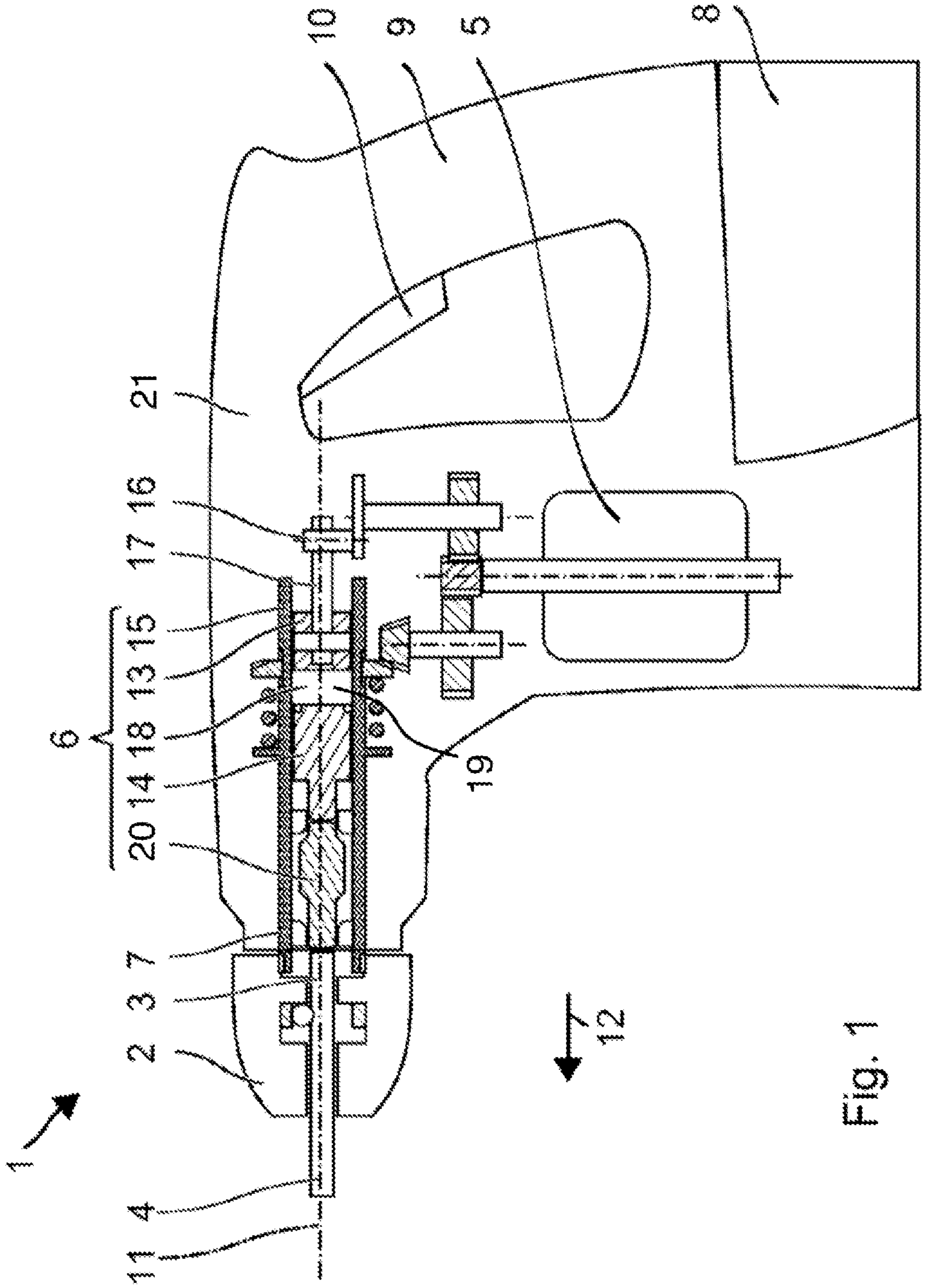
FIG. 1 shows a schematic view of a hammer drill.

FIG. 1 schematically shows a hammer drill 1 as an example of a striking or chiseling hand-held power tool. The hammer drill 1 has a tool fitting 2, in which a shaft end 3 of a tool, for example of a drill bit 4, can be inserted. A motor 5, which drives an impact mechanism 6 and a drive shaft 7, forms a primary drive of the hammer drill 1. A battery 8 or a power cord supplies the motor 5 with power. A user can hold and guide the hammer drill 1 by means of a handle 9. Furthermore, the user can put the hammer drill 1 into operation by means of a main switch 10. As a result of the main switch 10 being actuated, the drive shaft 7 coupled to the tool fitting 2 sets the tool fitting 2 into rotation about a working axis 11. As a result, the tool 4 is rotated about the working axis 11. During operation, in addition to the rotation about the working axis 11, the hammer drill 1 can strike the tool 4 into a substrate in a striking direction 12 along the working axis 11. In one exemplary embodiment, the hammer drill 1 has a mode selector switch (not shown), by way of which the tool fitting 2 can be uncoupled from the drive shaft 7 such that a purely striking/chiseling mode of the hammer drill 1 is possible.

The impact mechanism 6 is a pneumatic impact mechanism. An exciter piston 13 and an impact piston 14 are guided in movement along the working axis 11 in a guide tube 15 in the impact mechanism 6. The exciter piston 13 is coupled to the motor 5 via an eccentric 16 and forced to carry out a periodic, linear movement. A connecting rod 17 connects the eccentric 16 to the exciter piston 13. A pneumatic spring 18 formed by a pneumatic chamber 19 between the exciter piston 13 and the impact piston 14 couples a movement of the impact piston 14 to the movement of the exciter piston 13. The impact piston 14 strikes an anvil 20, which transfers the impact to the drill bit 4. The impact mechanism 6 and preferably the further drive components are arranged within a machine housing 21.

Figure 2:
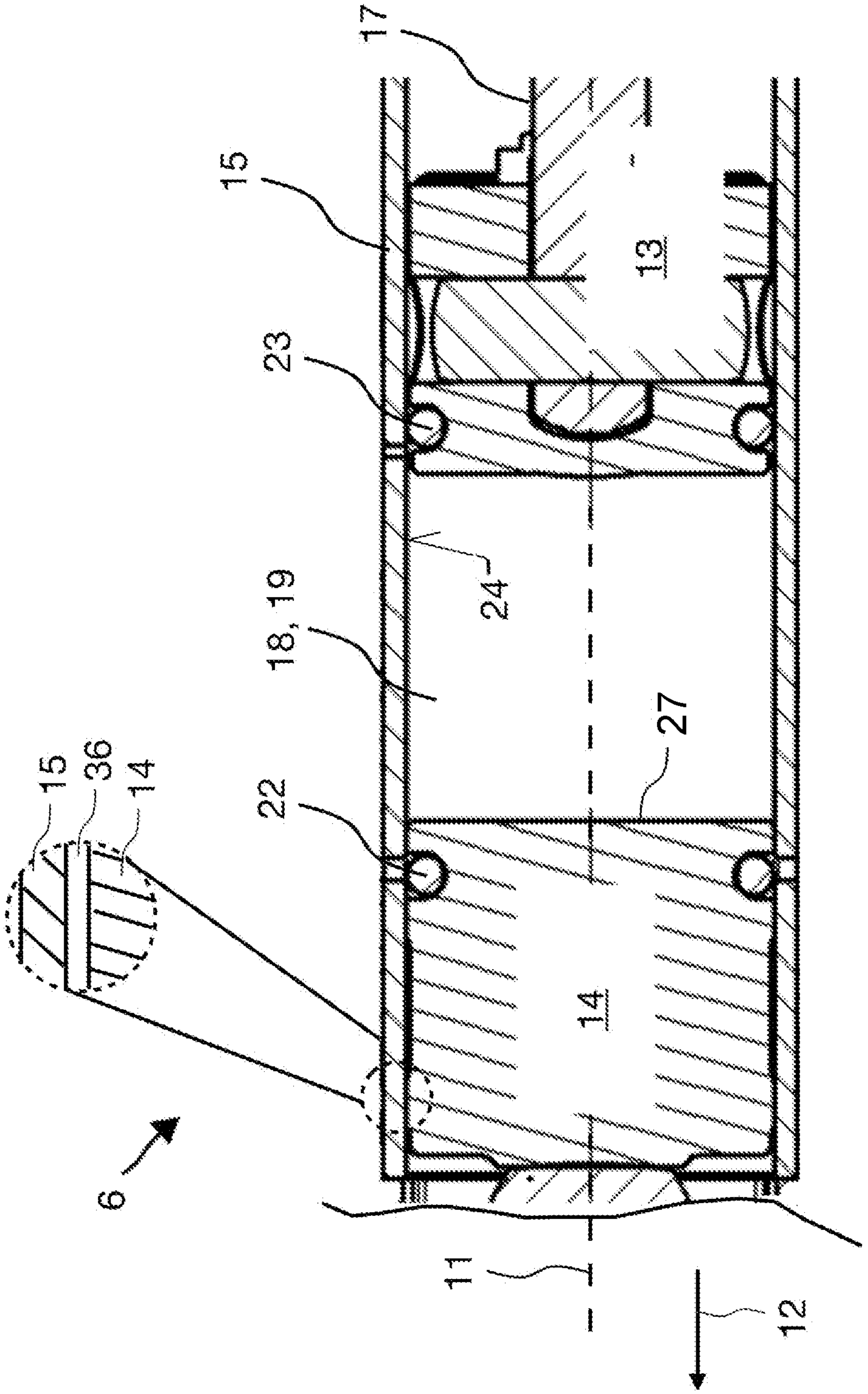
FIG. 2 shows a schematic view of a part of a pneumatic impact mechanism of the hammer drill from FIG. 1.

FIG. 2 shows a part of the impact mechanism 6 from FIG. 1 in an enlarged view. As can be seen in FIG. 2, the pneumatic chamber 19 of the pneumatic spring 18 is delimited by the exciter piston 13, the impact piston 14 and the guide tube 15. In particular, both the exciter piston 13 and the impact piston 14 are guided on an inner face 24 of the guide tube 15 and coaxially with the working axis 11. Furthermore, the impact piston 14 can be sealed off from the inner face 24 of the guide tube 15 by means of a preloaded O-ring 22 and the exciter piston 13 can be sealed off therefrom by means of a preloaded O-ring 23.

Figure 3:
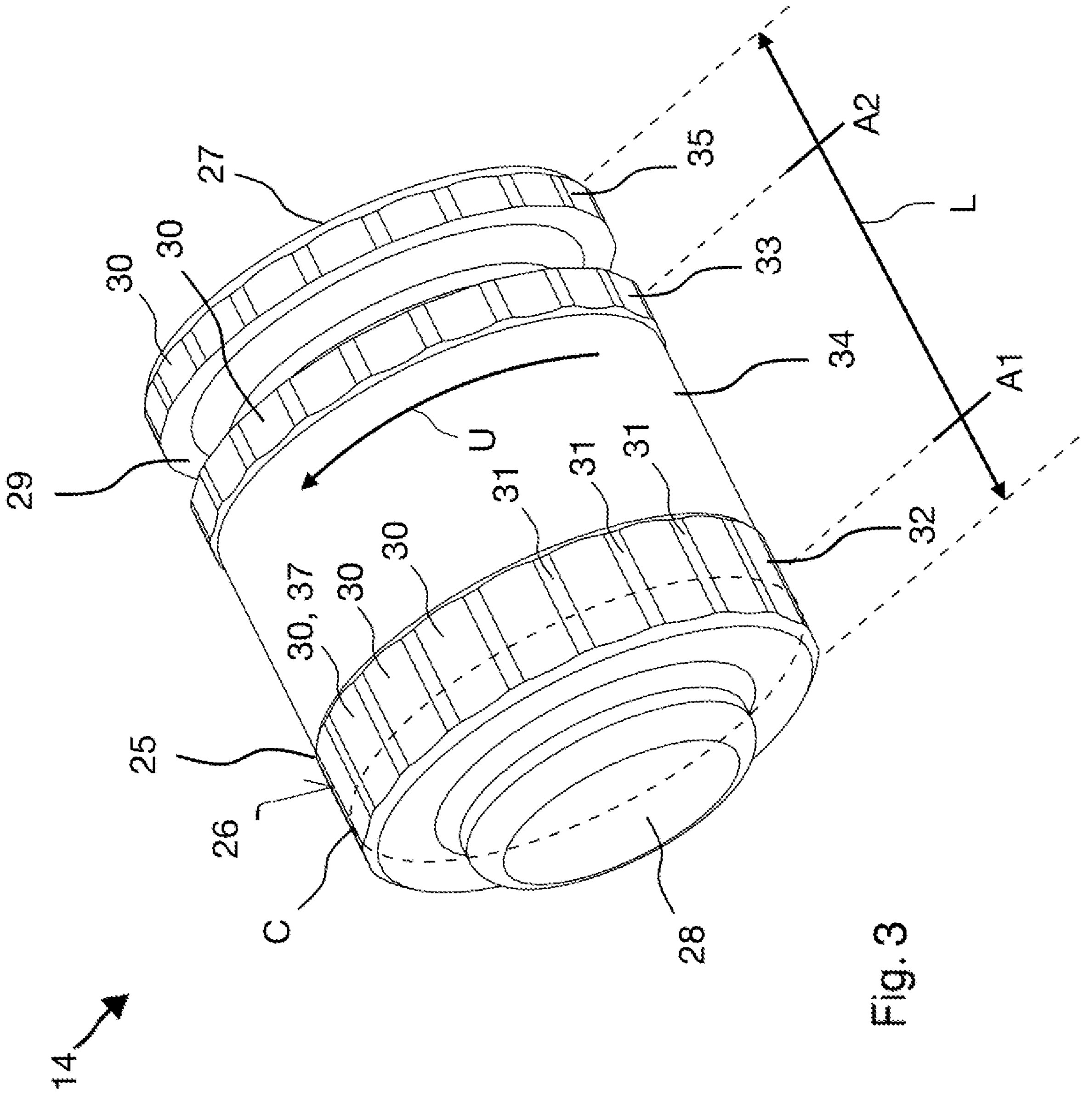
FIG. 3 shows a schematic view of an impact piston of the impact mechanism from FIG. 2 according to a first embodiment.

FIG. 3 shows the impact piston 14 in detail. The impact piston 14 has a substantially cylindrical shape 25 with a cylindrical surface 26, which is a lateral face of the cylindrical shape 25. The two base faces of the cylindrical shape 25 are formed by a pulse-receiving end face (first end face 27), which faces the exciter piston 13 and forms a boundary of the pneumatic chamber 19, and a pulse-emitting end face 28 (second end face 28), which strikes the anvil 20 (see also FIGS. 1 and 2).

As can be seen in FIG. 3, the impact piston 14 has an annular groove 29, arranged next to the first end face 27, for receiving the sealing ring 22 (FIG. 2).

The cylindrical surface 26 of the impact piston 14 has a plurality of cutouts 30 that are distributed in the circumferential direction U. In FIG. 3, for reasons of clarity, only some of the cutouts 30 have been provided with a reference numeral. By way of the cutouts 30, the cylindrical surface 26 is divided in the circumferential direction U into a plurality of guide segments 31 for guiding on the inner face 24 of the guide tube 15 (FIG. 2).

In particular, the cylindrical surface 26 of the impact piston 14 has two guide ring faces 32, 33 arranged between the annular groove 29 and the second end face 28. Each of the guide ring faces 32, 33 has the plurality of cutouts 30 that are distributed in the circumferential direction U and the guide segments 31 located in between. Between the guide ring faces 32, 33, the cylindrical surface 26 has a radially inwardly offset ring face 34. The radially inwardly offset ring face 34 does not itself have any cutouts and does not form a guide face for guiding on the inner face 24 of the guide tube 15.

Moreover, in the example of the impact piston 14 that is shown in FIG. 3, a further guide ring face 35 having cutouts 30 is arranged between the annular groove 29 and the first end face 27.

In the case of the impact piston 14 shown in FIG. 3, the guide segments 31 of the three guide ring faces 32, 33, 35 are guided on the inner face 24 of the guide tube 15. In particular, a gap 36 (see enlarged detail in FIG. 2) is located between the guide segments 31 of the three guide ring faces 32, 33, 35 and the inner face 24 of the guide tube 15. The gap 36 is filled with a lubricant.

In order to reduce shear friction of the lubricant between the impact piston 14 and the guide tube 15—in particular also at low temperatures, at which the lubricant is highly viscous and accordingly thick and sticky—the cylindrical surface 26 of the impact piston 14 has the cutouts 30. These cutouts 30 take up at least 30%, at least 50% and/or at least 70% of a circumference C (FIG. 3) of the cylindrical surface 26 of the impact piston 14. In particular the cutouts 30 take up at least 30%, at least 50% and/or at least 70% of the circumference C of the cylindrical surface 26 of the impact piston 14 at a particular axial position A1, A2 of a length L of the impact piston 14. In particular, the cutouts 30 take up at least 30%, at least 50% and/or at least 70% of each of the guide ring faces 32, 33, 35.

In the example shown in FIG. 3, the cutouts 30 are distributed uniformly in the circumferential direction U. In other examples, the cutouts 30 can also be distributed non-uniformly in the circumferential direction U.

In the example shown in FIG. 3, all the cutouts 30 in the guide ring face 32 have an elongate shape 37 extending parallel to the working axis 11, i.e. parallel to a longitudinal direction L of the impact piston 14. For reasons of clarity, only one of the elongate shapes 37 of the guide ring face 32 has been provided with a reference sign. In the example shown in FIG. 3, the cutouts 30 in the guide ring faces 33, 35 do not have an elongate shape extending parallel to the working axis 11. In other examples, the cutouts 30 in the guide ring faces 33, 35 can also have elongate shapes 37 or the cutouts 30 in the guide ring face 32 may also not have an elongate shape 37.

The cutouts 30 are in particular recesses or hollows, which are recessed radially inwardly from an imaginary closed rotationally symmetric cylinder shape. The cutouts 30 have been produced in particular by means of machining, in particular grinding, milling and/or a faceting cut. In other exemplary embodiments, the cutouts 30 can also have been produced by means of non-cutting deformation and/or by means of knurling and subsequent finish grinding.

Figure 4:
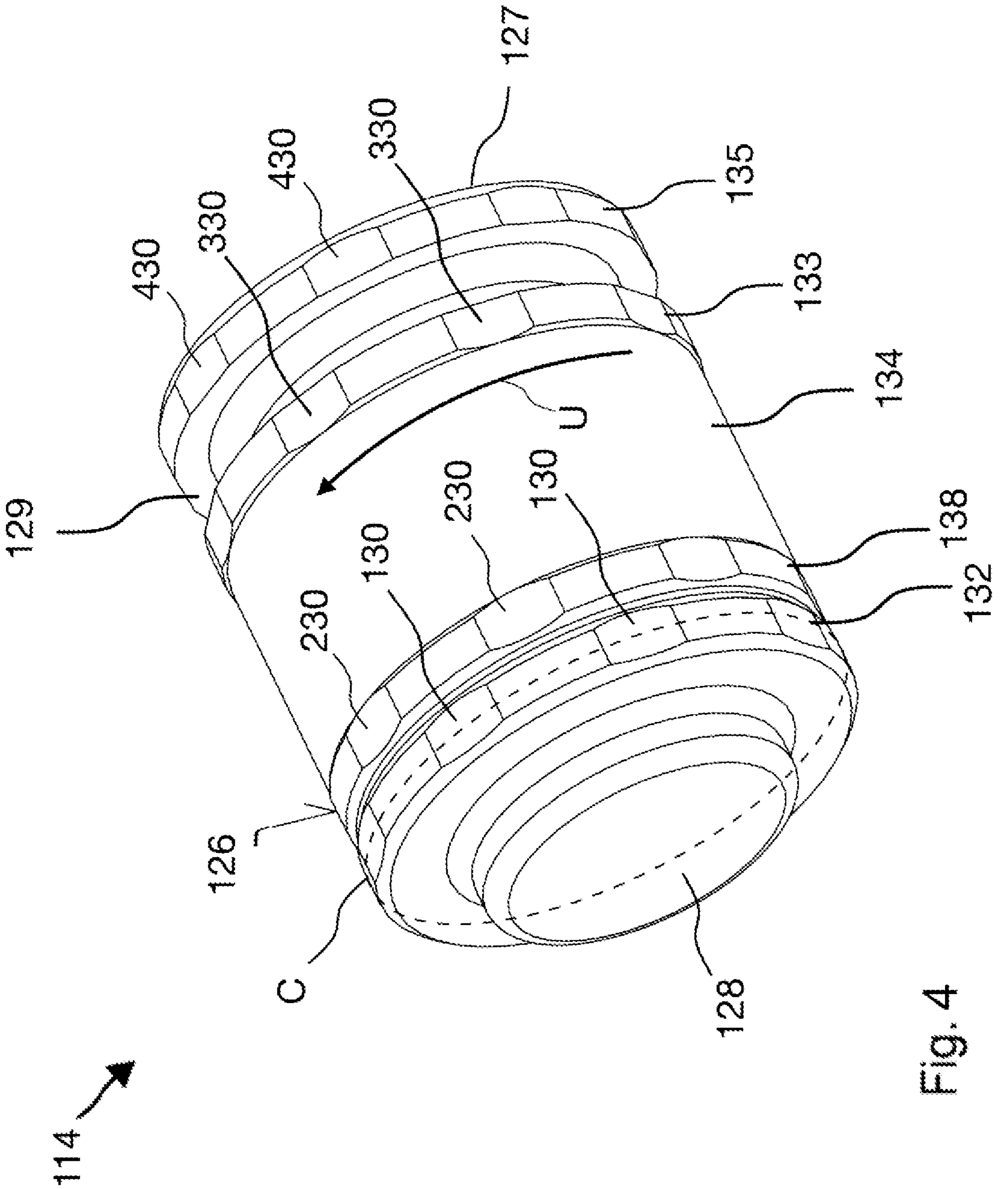
FIG. 4 shows a schematic view of an impact piston of the impact mechanism from FIG. 2 according to a second embodiment.

FIG. 4 shows an impact piston 114 according to a second embodiment. In the following text, only those features of the impact piston 114 that differ from the impact piston 14 according to the first embodiment are described. A cylindrical surface 126 of the impact piston 114 has three guide ring faces 132, 138 and 133 arranged between an annular groove 129 and a second end face 128. Each of the guide ring faces 132, 138, 133 has a plurality of cutouts 130, 230, 330 that are distributed in the circumferential direction U and guide segments (without a reference numeral in FIG. 4) located in between. Between the guide ring faces 138 and 133, the cylindrical surface 126 has a radially inwardly offset ring face 134. The radially inwardly offset ring face 134 does not itself have any cutouts and does not form a guide face for guiding on the inner face 24 of the guide tube 15.

Moreover, in the example of the impact piston 114 that is shown in FIG. 4, a further guide ring face 135 having cutouts 430 is arranged between the annular groove 129 and a first end face 127.

In the case of the impact piston 114, the cutouts 130 in the guide ring face 132 are arranged in a manner offset in the circumferential direction U with respect to the cutouts 230 in the guide ring face 138. Furthermore, the cutouts 330 in the guide ring face 133 are arranged in a manner offset in the circumferential direction U with respect to the cutouts 430 in the guide ring face 135.

As a result of the offset arrangement of the cutouts 130 with respect to the cutouts 230 and of the cutouts 330 with respect to the cutouts 430, the impact piston 114 can be guided uniformly in the guide tube 15 in spite of the interruptions in the guide face that are created by the cutouts.

Moreover, the impact piston 114 can be produced particularly easily and cost-effectively by means of centerless grinding (through-feed grinding), since the cutouts 130, 230, 330, 430 are arranged such that the impact piston 114 can roll uniformly on a plane during production in spite of the cutouts 130, 230, 330, 430.

LIST OF REFERENCE SIGNS

1 Hand-held power tool
2 Tool fitting
3 Shaft end
4 Tool
5 Motor
6 Impact mechanism
7 Drive shaft
8 Battery
9 Handle
10 Main switch
11 Working axis
12 Striking direction
13 Exciter
14 Impact piston
15 Guide tube
16 Eccentric
17 Connecting rod
18 Pneumatic spring
19 Pneumatic chamber
20 Anvil
21 Housing
22 Sealing ring
23 Sealing ring
24 Inner face
25 Cylindrical shape
26 Cylindrical surface
27 End face
28 End face
29 Annular groove
30 Cutout
31 Guide segment
32 Guide ring face
33 Guide ring face
34 Ring face
35 Guide ring face
36 Gap
37 Elongate shape
114 Impact piston
126 Cylindrical surface
128 Second end face
129 Annular groove
130 Cutout
132 Guide ring face
133 Guide ring face
134 Ring face
135 Guide ring face
138 Guide ring face
230 Cutout
330 Cutout
430 Cutout
A1 Axial position
A2 Axial position
C Circumference
U Circumferential direction
L Length, longitudinal direction

What is claimed is:

1. A hand-held power tool comprising:

a pneumatic impact mechanism having an impact piston movable back and forth along a working axis in a guide tube via a pneumatic spring, a cylindrical surface of the impact piston having a plurality of cutouts distributed in the circumferential direction, and the cutouts taking up at least 30% of a circumference of the cylindrical surface of the impact piston wherein the cylindrical surface of the impact piston has at least one guide ring face and the cutouts take up at least 30% of the guide ring face.

2. The hand-held power tool as recited in claim 1 wherein the plurality of cutouts take up at least 50% of the circumference.

3. The hand-held power tool as recited in claim 1 wherein the plurality of cutouts take up at least 70% of the circumference.

4. The hand-held power tool as recited in claim 1 wherein the plurality of cutouts take up at least 50% of the guide ring face.

5. The hand-held power tool as recited in claim 4 wherein the plurality of cutouts take up at least 70% of the guide ring face.

6. The hand-held power tool as recited in claim 1 wherein the cutouts are distributed uniformly in the circumferential direction.

7. The hand-held power tool as recited in claim 1 wherein the cutouts have an elongate shape extending parallel to the working axis.

8. The hand-held power tool as recited in claim 1 wherein cutouts are recesses, hollows, facets or flats.

9. The hand-held power tool as recited in claim 1 wherein the cutouts are produced by machining.

10. The hand-held power tool as recited in claim 1 wherein the machined cutouts are produced by grinding, milling or a faceting cut.

11. The hand-held power tool as recited in claim 1 wherein the cutouts are produced by a non-cutting deformation.

12. The hand-held power tool as recited in claim 1 wherein the cutouts are knurls produced by knurling and subsequent finish grinding.

13. The hand-held power tool as recited in claim 1 wherein the cylindrical surface of the impact piston has at least three of the plurality of cutouts in the circumferential direction.

14. The hand-held power tool as recited in claim 1 wherein the at least one guide ring face includes two guide ring faces.

15. The hand-held power tool as recited in claim 14 wherein the cutouts take up at least 30% of each of the at least two guide ring faces.

16. The hand-held power tool as recited in claim 15 wherein the cutouts take up at least 50% of each of the at least two guide ring faces.

17. The hand-held power tool as recited in claim 16 wherein the cutouts take up at least 70% of each of the at least two guide ring faces.

18. The hand-held power tool as recited in claim 1 wherein the cylindrical surface of the impact piston is divided in the circumferential direction by the plurality of cutouts into a plurality of guide segments for guiding on an inner face of the guide tube.

19. The hand-held power tool as recited in claim 1 wherein the impact mechanism has an exciter piston movable back and forth periodically along the working axis in the guide tube by a motor of the hand-held power tool, wherein the impact piston is coupled to the exciter piston via the pneumatic spring so as to be movable along the working axis.

20. The hand-held power tool as recited in claim 1 wherein the at least one guide ring face has at least two guide ring faces and the cutouts take up at least 30% of the at least two guide ring faces, the cutouts of a first of the at least two guide faces being offset in the circumferential direction with respect to the cutouts of a second of the at least two guide faces.

21. A hand-held power tool comprising:

a pneumatic impact mechanism having an impact piston movable back and forth along a working axis in a guide tube via a pneumatic spring, a cylindrical surface of the impact piston having a plurality of cutouts distributed in the circumferential direction, and the cutouts taking up at least 30% of a circumference of the cylindrical surface of the impact piston;

wherein the cutouts are knurls produced by knurling and subsequent finish grinding.

22. A hand-held power tool comprising:

a pneumatic impact mechanism having an impact piston movable back and forth along a working axis in a guide tube via a pneumatic spring, a cylindrical surface of the impact piston having a plurality of cutouts distributed in the circumferential direction, and the cutouts taking up at least 30% of a circumference of the cylindrical surface of the impact piston;

wherein the impact piston has:

a first end face for receiving a pulse of an exciter;

a second end face for emitting a pulse to a tool; and an annular groove, arranged next to the first end face, for receiving a sealing ring, the cylindrical surface of the impact piston having at least two guide ring faces arranged between the annular groove and the second end face and having the plurality of cutouts, a radially inwardly offset ring face being arranged between the at least two guide ring faces.

* * * * *